United States Patent
Girina et al.

(10) Patent No.: US 10,378,077 B2
(45) Date of Patent: Aug. 13, 2019

(54) METHOD FOR PRODUCING AN ULTRA HIGH STRENGTH COATED OR NOT COATED STEEL SHEET AND OBTAINED SHEET

(71) Applicant: ArcelorMittal, Luxembourg (LU)

(72) Inventors: Olga A. Girina, East Chicago, IN (US); Damon Panahi, East Chicago, IN (US)

(73) Assignee: ArcelorMittal, Luxembourg (LU)

( * ) Notice: Subject to any disclaimer, the term of this patent is extended or adjusted under 35 U.S.C. 154(b) by 142 days.

(21) Appl. No.: 15/323,232

(22) PCT Filed: Jul. 3, 2014

(86) PCT No.: PCT/IB2014/002379
§ 371 (c)(1),
(2) Date: Dec. 30, 2016

(87) PCT Pub. No.: WO2016/001707
PCT Pub. Date: Jan. 7, 2016

(65) Prior Publication Data
US 2017/0145536 A1    May 25, 2017

(51) Int. Cl.
| C21D 9/46 | (2006.01) |
| C21D 8/02 | (2006.01) |
| C21D 1/18 | (2006.01) |
| C25D 5/36 | (2006.01) |
| C25D 7/00 | (2006.01) |

(Continued)

(52) U.S. Cl.
CPC ............. *C21D 9/46* (2013.01); *B32B 15/00* (2013.01); *B32B 15/013* (2013.01); *B32B 15/04* (2013.01); *B32B 15/043* (2013.01); *B32B 15/18* (2013.01); *C21D 1/18* (2013.01); *C21D 1/25* (2013.01); *C21D 8/0236* (2013.01); *C21D 8/0247* (2013.01); *C21D 8/0278* (2013.01); *C21D 8/0447* (2013.01); *C22C 38/00* (2013.01); *C22C 38/02* (2013.01); *C22C 38/04* (2013.01); *C22C 38/06* (2013.01); *C22C 38/22* (2013.01); *C22C 38/26* (2013.01); *C22C 38/34* (2013.01); *C22C 38/38* (2013.01); *C23C 2/04* (2013.01); *C23C 2/06* (2013.01); *C23C 2/12* (2013.01); *C23C 2/28* (2013.01); *C23C 2/40* (2013.01); *C23C 30/00* (2013.01); *C23C 30/005* (2013.01); *C25D 3/22* (2013.01); *C25D 5/36* (2013.01); *C25D 7/00* (2013.01); *C25D 7/0614* (2013.01); *C21D 2211/001* (2013.01); *C21D 2211/008* (2013.01); *Y10T 428/12757* (2015.01);

(Continued)

(58) Field of Classification Search
CPC .......... C21D 1/18; C21D 1/25; C21D 8/0447; C21D 9/46; C21D 2211/001; C21D 2211/008; C21D 8/0278; C21D 8/0247; C21D 8/005; C21D 8/02; C21D 8/0205; C21D 8/0273; C21D 8/0473; C21D 8/0236; C23C 2/40; C23C 2/28; C23C 2/06; C23C 2/12; C23C 2/04; C23C 30/00; C23C 30/005; C22C 38/00; C22C 38/02; C22C 38/04; C22C 38/06; C22C 38/22; C22C 38/38; C22C 38/34; C22C 38/26; C22C 38/12; C22C 38/18; C25D 7/0614; C25D 7/00; C25D 5/36; C25D 3/22; C25D 8/0236; B32B 15/013; B32B 15/00; B32B 15/04; B32B 15/043; B32B 15/18; Y10T 428/12799; Y10T 428/12757; Y10T 428/12951; Y10T 428/12972
See application file for complete search history.

(56) References Cited

U.S. PATENT DOCUMENTS

| 8,828,557 B2 | 9/2014 | Takagi et al. |
| 9,121,087 B2 | 9/2015 | Matsuda et al. |

(Continued)

FOREIGN PATENT DOCUMENTS

| CN | 101225499 A | 7/2008 |
| CN | 102149840 A | 8/2011 |

(Continued)

OTHER PUBLICATIONS

Guhui Gao et al: "Enhanced Ductility and Toughness in an Ultrahigh-Strength Mn—Si—Cr—C Steel: The Great Potential of Ultrafine Filmy Retained Austentite'" Acta Materialia, vol. 76, Jun. 26, 2014, pp. 425-433.

(Continued)

*Primary Examiner* — Michael E. La Villa
(74) *Attorney, Agent, or Firm* — Davidson, Davidson & Kappel, LLC

(57) ABSTRACT

A method for producing a cold rolled steel sheet having a tensile strength ≥1470 MPa and a total elongation TE≥19%, the method comprising the steps of annealing at an annealing temperature AT≥Ac3 a non-treated steel sheet whose chemical composition contains in weight %: 0.34%≤C≤0.40%, 1.50%≤Mn≤2.30%, 1.50≤Si≤2.40%, 0%<Cr≤0.5%, 0%<Mo≤0.3%, 0.01%≤Al≤0.07%, the remainder being Fe and unavoidable impurities, quenching the annealed steel sheet by cooling it to a quenching temperature QT<Ms transformation point and between 150° C. and 250° C., and making a partitioning treatment by reheating the quenched steel sheet to a partitioning temperature PT between 350° C. and 420° C. and maintaining the steel sheet at this temperature during a partitioning time Pt between 15 seconds and 120 seconds.

7 Claims, No Drawings

(51) Int. Cl.

| | |
|---|---|
| C25D 3/22 | (2006.01) |
| B32B 15/01 | (2006.01) |
| C22C 38/38 | (2006.01) |
| C22C 38/34 | (2006.01) |
| C22C 38/22 | (2006.01) |
| C22C 38/06 | (2006.01) |
| C23C 2/04 | (2006.01) |
| B32B 15/04 | (2006.01) |
| C23C 30/00 | (2006.01) |
| C23C 2/12 | (2006.01) |
| B32B 15/18 | (2006.01) |
| B32B 15/00 | (2006.01) |
| C21D 1/25 | (2006.01) |
| C22C 38/00 | (2006.01) |
| C22C 38/02 | (2006.01) |
| C22C 38/04 | (2006.01) |
| C21D 8/04 | (2006.01) |
| C23C 2/28 | (2006.01) |
| C25D 7/06 | (2006.01) |
| C22C 38/26 | (2006.01) |
| C23C 2/06 | (2006.01) |
| C23C 2/40 | (2006.01) |

(52) U.S. Cl.
 CPC .............. Y10T 428/12799 (2015.01); Y10T 428/12951 (2015.01); Y10T 428/12972 (2015.01)

(56) References Cited

U.S. PATENT DOCUMENTS

| | | |
|---|---|---|
| 9,200,343 B2 | 12/2015 | Matsuda et al. |
| 9,290,834 B2 | 3/2016 | Hasegawa et al. |
| 2004/0074575 A1 | 4/2004 | Kashima |
| 2006/0144482 A1 | 7/2006 | Moulin |
| 2011/0146852 A1 | 6/2011 | Matsuda et al. |
| 2011/0168301 A1 | 7/2011 | Song et al. |
| 2011/0198002 A1* | 8/2011 | Nakagaito ............... C22C 38/02 148/533 |
| 2013/0087253 A1 | 4/2013 | Matsuda et al. |
| 2013/0133786 A1 | 5/2013 | Matsuda et al. |
| 2015/0203947 A1* | 7/2015 | Hasegawa ............. B32B 15/013 428/659 |
| 2017/0137910 A1 | 5/2017 | Girina et al. |

FOREIGN PATENT DOCUMENTS

| | | |
|---|---|---|
| CN | 102884209 A | 1/2013 |
| CN | 102884218 A | 1/2013 |
| CN | 103103435 A | 5/2013 |
| CN | 103361547 A | 10/2013 |
| DE | 10161465 C1 | 2/2003 |
| EP | 2325346 A1 | 5/2011 |
| EP | 2546368 A1 | 1/2013 |
| EP | 2660345 A2 | 11/2013 |
| EP | 2762592 A1 | 8/2014 |
| EP | 2762600 A1 | 8/2014 |
| JP | S61157625 A | 7/1986 |
| JP | 2004308002 A | 11/2004 |
| JP | 2012031462 A | 2/2012 |
| RU | 2341566 C2 | 12/2008 |
| RU | 2491357 C1 | 8/2013 |
| WO | 2004022794 A1 | 3/2004 |
| WO | 2010126161 A1 | 11/2010 |
| WO | WO-2014020640 A1 * | 2/2014 ........... B32B 15/013 |

OTHER PUBLICATIONS

Guhui Gao et al: A Carbide-Free Bainite/Martensite/Austenite Triplex Steel with Enhanced Mechanical Properties Treated by a Novel Quenching-Partitioning-Tempering Process, Materials Science and Engineering A, vol. 559, Jan. 1, 2013, pp. 165-169.

Kai Zhang et al: "Microstructure and Mechanical Properties of a Nb-Microalloyed Medium Carbon Steel Treated by Quenching-Partitioning Process", Key Engineering Materials, vol. 531-532, Dec. 1, 2012, pp. 596-599.

Kohichi Sugimoto et al: "Hot Forging of Ultra High-Strength Trip-Aided Steel", Materials Sceince Forum, vol. 638-642, Jan. 1, 2010, pp. 3074-3079.

John G Speer et al: "Analysis of Microstructure Evolution in Quenching and Partitioning Automotive Sheet Steel", Metallurgical and Materials Transactions A, Springer-Verlag, New York, vol. 42, Sep. 15, 2011, pp. 3591-3601.

* cited by examiner

METHOD FOR PRODUCING AN ULTRA HIGH STRENGTH COATED OR NOT COATED STEEL SHEET AND OBTAINED SHEET

The present invention concerns the manufacture of coated or non-coated high strength steel sheet having improved tensile strength and improved total elongation and the sheets obtained by this method.

To manufacture various equipment such as parts of body structural members and body panels for automotive vehicles, it is now usual to use bare, electro-galvanized, galvanized or galvannealed sheets made of DP (dual phase) steels multi-phase, complex phase or martensitic steels.

For example, a high strength multi-phase may include a bainite-martensitic structure with/without some retained austenite and contains about 0.2% of C, about 2% of Mn, about 1.5% of Si which would result in yield strength of about 750 MPa, a tensile strength of about 980 MPa, a total elongation of about 10%. These sheets are produced on continuous annealing line by quenching from an annealing temperature higher than Ac3 transformation point, down to an overaging temperature above Ms Transformation point and maintaining the sheet at the temperature for a given time. Optionally, the sheet is galvanized or galvannealed.

To reduce the weight of the automotive parts in order to improve their fuel efficiency in view of the global environmental conservation it is desirable to have sheets having improved strength-ductility balance. But such sheets must also have a good formability.

In this respect, it was proposed to produce sheets made of steel using so called quenched and partitioned having improved mechanical properties and good formability. Coated or non-coated (bare) sheets having, a tensile strength TS of about 1470 MPa and a total elongation of at least 19%, are targeted.

Therefore, the purpose of the present invention is to provide such sheet and a method to produce it.

For this purpose, the invention relates to a method for producing a cold rolled steel sheet having a tensile strength TS of at least 1470 MPa and a total elongation TE of at least 19%, the method comprising the successive steps of:
  annealing at an annealing temperature AT a cold rolled steel sheet made of steel whose chemical composition contains in weight %:

$0.34\% \leq C \leq 0.40\%$ $1.50\% \leq Mn \leq 2.30\%$ $1.50 \leq Si \leq 2.40\%$ $0\% < Cr \leq 0.5\%$ $0\% < Mo \leq 0.3\%$ $0.01\% \leq Al \leq 0.08\%$ the remainder being Fe and unavoidable impurities, the annealing temperature AT being equal or higher than the Ac3 transformation point of the steel, to obtain an annealed steel sheet,
  quenching the annealed steel sheet by cooling it down to a quenching temperature QT lower than the Ms transformation point of the steel, typically between 150° C. and 250° C., to obtain a quenched steel sheet, and,
  making a partitioning treatment by reheating the quenched steel sheet at a partitioning temperature PT between 350° C. and 450° C. and maintaining the steel sheet at this temperature during a partitioning time Pt between 15 seconds and 150 seconds.

Preferably, the annealing temperature AT is between 870° C. and 930° C.

In two embodiments, after partitioning the steel sheet is cooled to the room temperature in order to obtain a non-coated steel sheet:

In the first embodiment, the composition of the steel is such that $0.36\% \leq C \leq 0.40\%$, $Cr < 0.05\%$ and $Mo < 0.05\%$, the quenching temperature is between 190° C. and 210° C. and the partitioning time Pt is between 90 seconds and 110 seconds.

In the second embodiment, the composition of the steel is such that $0.34\% \leq C \leq 0.37\%$, $0.35\% \leq Cr \leq 0.45\%$ and $0.07\% \leq Mo \leq 0.20\%$, the quenching temperature is between 200° C. and 230° C. and the partitioning time Pt is between 25 seconds and 120 seconds.

Preferably, the bare cold rolled steel is afterwards electro-galvanized.

In one embodiment, after partitioning the steel sheet is galvanized then cooled to the room temperature in order to obtain a coated steel sheet, the composition of the steel is such that $0.34\% \leq C \leq 0.37\%$, $0.35\% \leq Cr \leq 0.45\%$ and $0.07\% \leq Mo \leq 0.20\%$, the quenching temperature is between 200° C. and 230° C. and the partitioning time Pt is between 25 seconds and 55 seconds.

The invention relates also to a coated or non-coated steel sheet made of steel whose chemical composition comprises in weight %:

$0.34\% \leq C \leq 0.40\%$ $1.50\% \leq Mn \leq 2.30\%$ $1.50 \leq Si \leq 2.40\%$ $0\% < Cr \leq 0.5\%$ $0\% < Mo \leq 0.3\%$ $0.01\% \leq Al \leq 0.08\%$ the remainder being Fe and unavoidable impurities, the structure comprising at least 60% of martensite and between 12% and 15% of residual austenite, the tensile strength is at least 1470 MPa and the total elongation being at least 19%.

In a particular embodiment, the steel sheet is non-coated, the composition of the steel is such that $0 < Cr < 0.05\%$ and $0 < Mo < 0.05\%$, and the yield strength is higher than 1150 MPa.

In another embodiment, the steel sheet is non-coated, the composition of the steel is such that $0.35 < Cr < 0.45\%$ and $0.07 < Mo < 0.20\%$, and the yield strength is higher than 880 MPa, the tensile strength is higher than 1520 MPa, and the total elongation is of at least 20%.

In another embodiment, the steel sheet is galvanized, the composition of the steel is such that $0.35\% \leq Cr \leq 0.45\%$ and $0.07\% \leq Mo \leq 0.20\%$, the tensile strength is higher than 1510 MPa and the total elongation is at least 20%.

The invention will now be described in details but without introducing limitations.

According to the invention, the sheet is obtained by heat treating a hot or preferably a cold rolled non-treated steel sheet made of steel which chemical composition contains, in weight %:
  0.34% to 0.40% of carbon to ensure a satisfactory strength and improve the stability of the retained austenite. This is necessary to obtain a sufficient elongation. If carbon content is too high, the hot rolled sheet is too hard to cold roll and the weldability is insufficient.

1.50% to 2.40% of silicon in order to stabilize the austenite, to provide a solid solution strengthening and to delay the formation of carbides during partitioning with appropriate procedures to prevent the formation of silicon oxides at the surface of the sheet which is detrimental to coatability.

1.50% to 2.30% of manganese to have a sufficient hardenability in order to obtain a structure containing at least 60% of martensite, a tensile strength of more than 1470 MPa and to avoid having segregation issues which are detrimental for the ductility.

0% to 0.3% of molybdenum and 0% to 0.5% of chromium to increase the hardenability and to stabilize the retained austenite in order to strongly reduce austenite decomposition during partitioning. The absolute zero value is excluded due to residual amounts. When the steel sheet is non-coated, the molybdenum and the chromium can be eliminated and their contents can remain less than 0.05% each. When the steel sheet is coated by galvanizing, the molybdenum content is preferably from 0.07% to 0.20% and the chromium content is preferably from 0.35% to 0.45%.

0.01% to 0.08% of aluminum which is usually added to liquid steel for the purpose of deoxidation, preferably.

The remainder is iron and residual elements or unavoidable impurities resulting from the steelmaking. In this respect, Ni, Cu, V, Ti, B, S, P and N at least are considered as residual elements which are unavoidable impurities. Therefore, generally, their contents are less than 0.05% for Ni, 0.05 for Cu, 0.007% for V, 0.001% for B, 0.005% for S, 0.02% for P and 0.010% for N. Addition of microalloy elements such as Nb from 0 to 0.05% and/or Ti from 0 to 0.1% could be utilized to obtain the desired microstructure and an optimal combination of product properties The non-treated steel sheet is a cold rolled sheet prepared according to the methods known by those who are skilled in the art.

After rolling the sheets are pickled or cleaned then heat treated and optionally hot dip coated.

The heat treatment which is made preferably on a continuous annealing when the sheet is not coated and on a hot dip coating line when the steel sheet is coated, comprises the following successive steps:

annealing the cold rolled sheet at an annealing temperature AT equal or higher than the Ac3 transformation point of the steel, and preferably higher than Ac3+15° C., in order to obtain an annealed steel sheet having a structure completely austenitic, but less than 1000° C. in order not to coarsen too much the austenitic grains. Generally, a temperature higher than 870° C. is enough for the steel according to the invention and this temperature does not need to be higher to 930° C. Then the steel sheet is maintained at this temperature i.e. maintained between AT−5° C. and AT+10° C., for a time sufficient to homogenize the temperature in the steel. Preferably, this time is of more than 30 seconds but does not need to be more than 300 seconds. To be heated to the annealing temperature, the cold rolled steel sheet is, for example, first heated to a temperature of about 600° C. at a speed typically below 20° C./s then heated again to a temperature of about 800° C. at a speed typically below 10° C./s and eventually heated to the annealing temperature at a heating speed below 5° C./s. In this case, the sheet is maintained at the annealing temperature for a duration between 40 and 150 seconds.

quenching of the annealed sheet by cooling down to a quenching temperature QT lower than the Ms transformation point between 150° C. and 250° C. at a cooling rate fast enough to avoid ferrite formation upon cooling and preferably of more than 35° C./second, in order to obtain a quenched sheet having a structure consisting of martensite and austenite, then the final structure contains at least 60% of martensite and between 12% and 15% of austenite. If the steel contains less than 0.05% of molybdenum and less than 0.05% of chromium, the quenching temperature is preferably between 190° C. and 210° C. When the steel sheet has to be galvanized and when the chemical composition of the steel is such that 0.34%≤C≤0.37%, 0.35%≤Cr≤0.45% and 0.07%≤Mo≤0.20%, then the quenching temperature is preferably between 200° C. and 230° C.

reheating the quenched sheet up to a partitioning temperature PT between 350° C. and 450° C. The heating speed is preferably at least 30° C./s.

maintaining the sheet at the partitioning temperature PT for a partitioning time Pt between 15 sec and 150 sec. During the partitioning step, the carbon is partitioned, i.e. diffuses from the martensite into the austenite which is thus enriched.

Optionally, cooling the sheet down to the room temperature if no coating is desired or heating the sheet to a coating temperature, hot dip coating the sheet and cooling it down to the room temperature if a coating is desired. The hot dip coating is, for example, galvanizing, and the coating temperature is about 460° C. as it is known in the art.

The heating to the coating temperature is made preferably at a heating speed of at least 30°/s and the coating takes between 2 and 10 s.

Whether or not a coating is applied, the cooling speed to the room temperature is preferably between 3 and 20° C./s.

When the sheet is not coated and the steel contains preferably less than 0.05% of chromium and less than 0.05% of molybdenum, then the partitioning time is preferably between 90 sec and 110 sec. With such treatment it is possible to obtain sheets having a yield strength of more than 1150 MPa, a tensile strength of more than 1470 MPa and a total elongation of more than 19%.

When the sheet is not coated and the steel contains 0.35% and 0.45% of chromium and between 0.07% and 0.20% of molybdenum, then the partitioning time is preferably between 15 sec and 120 sec. With such treatment it is possible to obtain sheets having a yield strength of more than 880 MPa, a tensile strength of more than 1520 MPa and a total elongation of more than 20%.

When the sheet is coated the steel contains preferably between 0.35% and 0.45% of chromium and between 0.07% and 0.20% of molybdenum and the partitioning time Pt is preferably between 25 seconds and 55 seconds. In these conditions it is even possible to obtain coated steel sheet having a tensile strength higher than 1510 MPa and a total elongation of at least 20%.

As examples and comparison, it was manufactured sheets made of steels whose compositions in weight and characteristic temperatures such as Ac3 and Ms are reported in table I.

The sheets were cold rolled, annealed, quenched, partitioned and cooled to the room temperature or, galvanized after partitioning before being cooled to the room temperature.

The mechanical properties were measured in the transverse direction relative to the direction of rolling. As it is well known in the art, the ductility level is slightly better in the direction of rolling than in the transverse direction for such high strength steel. Measured properties are Hole expansion ratio HER measured according to the standard ISO 16630:2009, the yield strength YS, the tensile stress TS, the uniform elongation UE and the total elongation TE.

The conditions of treatment and the mechanical properties are reported in Table II for the non coated sheets and in Table III for the coated sheets.

In these tables, AT is the annealing temperature, QT the quenching temperature, PT the partitioning temperature. In Table II, GI is the temperature of galvanizing.

TABLE I

| Ref steel | C % | Mn % | Si % | Cr % | Mo % | Al % | Ac3 °C. | Ms °C. |
|---|---|---|---|---|---|---|---|---|
| S180 | 0.29 | 2.02 | 2.44 | 0.004 | Residual (<0.003) | 0.059 | 920 | 290 |
| S181 | 0.39 | 2.03 | 1.95 | 0.003 | Residual (<0.003) | 0.058 | 860 | 240 |
| S80 | 0.36 | 1.99 | 1.95 | 0.41 | 0.088 | 0.045 | 850 | 250 |
| S81 | 0.38 | 1.98 | 1.93 | 0.34 | 0.14 | 1.047 | 860 | 270 |

TABLE II

| Example | steel | AT °C. | QT °C. | PT °C. | Pt sec | HE % | YS MPa | TS MPa | UE % | TE % |
|---|---|---|---|---|---|---|---|---|---|---|
| 1 | S180 | 920 | 240 | 400 | 10 | — | 982 | 1497 | 11.4 | 15.9 |
| 2 | S180 | 920 | 240 | 400 | 100 | 17 | 1073 | 1354 | 13.9 | 19.9 |
| 3 | S180 | 920 | 240 | 400 | 500 | — | 1082 | 1309 | 13.2 | 18.4 |
| 4 | S181 | 900 | 200 | 400 | 10 | — | 1095 | 1583 | 12.5 | 13.8 |
| 5 | S181 | 900 | 200 | 400 | 100 | 21 | 1238 | 1493 | 13.0 | 19.4 |
| 6 | S181 | 900 | 200 | 400 | 500 | — | 1207 | 1417 | 13.1 | 17.7 |
| 7 | S80 | 900 | 220 | 400 | 10 | — | 925 | 1658 | 9.4 | 9.4 |
| 8 | S80 | 900 | 220 | 400 | 30 | — | 929 | 1603 | 15.1 | 20.5 |
| 9 | S80 | 900 | 220 | 400 | 50 | — | 897 | 1554 | 16.1 | 21.1 |
| 10 | S80 | 900 | 220 | 400 | 100 | — | 948 | 1542 | 18.1 | 21.4 |
| 11 | S81 | 900 | 240 | 400 | 10 | — | 867 | 1623 | 8.1 | 9.3 |
| 12 | S81 | 900 | 240 | 400 | 30 | — | 878 | 1584 | 11.4 | 11.8 |
| 13 | S81 | 900 | 240 | 400 | 50 | — | 833 | 1520 | 10.8 | 12.2 |
| 14 | S81 | 900 | 240 | 400 | 100 | — | 840 | 1495 | 15.9 | 17.3 |

TABLE III

| example | Steel | AT °C. | QT °C. | PT °C. | GI °C. | Pt sec | HE % | YS MPa | TS MPa | UE % | TE % |
|---|---|---|---|---|---|---|---|---|---|---|---|
| 15 | S180 | 920 | 240 | 400 | 460 | 100 | 24 | 1127 | 1310 | 13.7 | 20.7 |
| 16 | S181 | 900 | 200 | 400 | 460 | 10 | — | 933.4 | 1348 | 14.0 | 18.0 |
| 17 | S181 | 900 | 200 | 400 | 460 | 30 | — | 1170 | 1425 | 13.8 | 20.1 |
| 18 | S181 | 900 | 180 | 400 | 460 | 100 | — | 1353 | 1507 | 8.0 | 14.1 |
| 19 | S181 | 900 | 200 | 400 | 460 | 100 | 19 | 1202 | 1399 | 13.0 | 20.2 |
| 20 | S181 | 900 | 220 | 400 | 460 | 100 | — | 936 | 1280 | 14.3 | 18.0 |
| 21 | S181 | 900 | 200 | 420 | 460 | 10 | — | 906 | 1346 | 11.2 | 10.6 |
| 22 | S181 | 900 | 200 | 420 | 460 | 30 | — | 841 | 1298 | 14.7 | 19.3 |
| 23 | S181 | 900 | 200 | 420 | 460 | 100 | — | 900 | 1322 | 14.5 | 19.1 |
| 24 | S181 | 900 | 200 | 360 | 460 | 10 | — | 910 | 1357 | 14.5 | 19.0 |
| 25 | S181 | 900 | 200 | 360 | 460 | 30 | — | 992 | 1356 | 14.0 | 18.9 |
| 26 | S80 | 900 | 220 | 400 | 460 | 10 | — | 756 | 1576 | 10.5 | 11.1 |
| 27 | S80 | 900 | 220 | 400 | 460 | 30 | — | 836 | 1543 | 18.3 | 20.3 |
| 28 | S80 | 900 | 220 | 400 | 460 | 50 | — | 906 | 1534 | 18.6 | 21.6 |
| 29 | S80 | 900 | 220 | 400 | 460 | 100 | — | 941 | 1394 | 8.1 | 8.58 |
| 30 | S81 | 900 | 240 | 400 | 460 | 10 | — | 704 | 1518 | 6.6 | 6.8 |
| 31 | S81 | 900 | 240 | 400 | 460 | 30 | — | 951 | 1438 | 8.9 | 8.9 |
| 32 | S81 | 900 | 240 | 400 | 460 | 50 | — | 947 | 1462 | 13.5 | 18.5 |
| 33 | S81 | 900 | 240 | 400 | 460 | 100 | — | 987 | 1447 | 15.7 | 19.6 |

The examples 1 to 14 show that it is only with the steel S181, which contains neither chromium nor molybdenum, and steel S80, which contains both chromium and molybdenum, that it is possible to reach the desired properties i.e. TS≥1470 MPa and TE≥19%. In alloy S181, the desired properties are achieved for a quenching temperature QT of 200° C. and a partitioning time of 100 seconds. In this case, the yield strength is higher than 1150MPa.

In alloy S80, which contains chromium and molybdenum, the desired properties are achieved for a quenching temperature QT of 220° C. and a partitioning time between 30 to 100 seconds (examples 7 to 10). In this case, the tensile strength is higher than 1520 MPa and the total elongation is more than 20%. Moreover, it is worth mentioning that all the examples containing Cr and Mo (7 to 14) have yield strengths significantly lower than the examples 1 to 6, concerning a steel without Cr and Mo.

The examples 15 to 33 show that only the examples corresponding to steels containing Cr and Mo are able to reach the desired properties when the sheets are galvanized (examples 27 and 28). For the steel S80, the quenching temperature has to be of 220° C. and a partitioning of 10 seconds is too short while a partitioning time of 100 seconds is too long. When the steel does not contain Cr and does not contain Mo, the tensile strength always remains lower than 1470 MPa.

The invention claimed is:

1. A non-coated steel sheet made of a steel comprising:
a chemical composition including in weight %:

0.34%≤C≤0.40%;

1.50%≤Mn≤2.30%;

1.50≤Si≤2.40%;

0.35%≤Cr≤0.45%;

0.07%≤Mo≤0.20%; and 0.01%≤Al≤0.08%;

a remainder being Fe and unavoidable impurities; and
a structure including, by volume, at least 60% of martensite and between 12% and 15% of residual austenite;

the steel sheet having a yield strength higher than 880 MPa, a tensile strength higher than 1520 MPa and a total elongation of at least 20%.

2. A method for producing the non-coated steel sheet according to claim 1, the method comprising the steps of:
annealing at an annealing temperature AT a cold rolled steel sheet made of a steel having a chemical composition including in weight %:

0.34%≤C≤0.40%;

1.50%≤Mn≤2.30%;

1.50≤Si≤2.40%;

0.35%≤Cr≤0.45%;

0.07%≤Mo≤0.20%; and 0.01%≤Al≤0.08%;

a remainder being Fe and unavoidable impurities, the annealing temperature AT being higher than an Ac3 transformation point of the steel, to obtain an annealed steel sheet; quenching the annealed steel sheet by cooling the annealed steel sheet down to a quenching temperature QT lower than an Ms transformation point of the steel and between 200° C. and 230° C., to obtain a quenched steel sheet;

performing a partitioning treatment by reheating the quenched steel sheet at a partitioning temperature PT between 350° C. and 450° C. and maintaining the quenched steel sheet at the partitioning temperature PT during a partitioning time Pt between 15 seconds and 120 seconds;

and after partitioning, cooling the steel sheet to room temperature in order to obtain the non-coated steel sheet having the structure including, by volume, at least 60% of martensite and between 12% and 15% of residual austenite;

the non-coated steel sheet having a yield strength higher than 880 MPa, a tensile strength higher than 1520 MPa and a total elongation of at least 20%.

3. The method according to claim 2, wherein the steps are performed successively.

4. The method according to claim 2, wherein the annealing temperature AT is between 870° C. and 930° C.

5. A coated steel sheet made of a steel comprising:
a chemical composition comprising in weight %:

0.34%≤C≤0.40%;

1.50%≤Mn≤2.30%;

1.50≤Si≤2.40%;

0.35%≤Cr≤0.45%;

0.07%≤Mo≤0.20%; and 0.01%≤Al≤0.08%;

a remainder being Fe and unavoidable impurities; and
a structure including, by volume, at least 60% of martensite and between 12% and 15% of residual austenite;
the steel sheet being galvanized,
the steel sheet having a tensile strength higher than 1510 MPa and a total elongation of at least 20%.

6. A method for producing the coated steel sheet according to claim 5, the method comprising the steps of:
annealing at an annealing temperature AT a cold rolled steel sheet made of a steel having a chemical composition including in weight %:

0.34%≤C≤0.40%;

1.50%≤Mn≤2.30%;

1.50≤Si≤2.40%;

0.35%≤Cr≤0.45%;

0.07%≤Mo≤0.20%; and 0.01%≤Al≤0.08%;

a remainder being Fe and unavoidable impurities, the annealing temperature AT being higher than an Ac3 transformation point of the steel, to obtain an annealed steel sheet; quenching the annealed steel sheet by cooling the annealed steel sheet down to a quenching temperature QT lower than an Ms transformation point of the steel and between 200° C. and 230° C., to obtain a quenched steel sheet;

performing a partitioning treatment by reheating the quenched steel sheet at a partitioning temperature PT between 350° C. and 450° C. and maintaining the quenched steel sheet at the partitioning temperature PT during a partitioning time Pt between 25 seconds and 55 seconds; and galvanizing the steel sheet then cooling the steel sheet to room temperature in order to obtain the coated steel sheet having the structure including, by volume, at least 60% of martensite and between 12% and 15% of residual austenite;

the steel sheet having a tensile strength higher than 1510 MPa and a total elongation of at least 20%.

7. The method according to claim 6, wherein the steps are performed successively.

* * * * *